(12) United States Patent
Kinouchi et al.

(10) Patent No.: US 9,312,685 B2
(45) Date of Patent: Apr. 12, 2016

(54) HYBRID INDUSTRIAL VEHICLE

(75) Inventors: Yusuke Kinouchi, Tokyo (JP); Kensuke Futahashi, Tokyo (JP); Kiyomitsu Ogawa, Tokyo (JP)

(73) Assignee: MITSUBISHI NICHIYU FORKLIFT CO., LTD., Kyoto (JP)

(*) Notice: Subject to any disclaimer, the term of this patent is extended or adjusted under 35 U.S.C. 154(b) by 202 days.

(21) Appl. No.: 14/113,139

(22) PCT Filed: Feb. 17, 2012

(86) PCT No.: PCT/JP2012/053861
§ 371 (c)(1),
(2), (4) Date: Jun. 2, 2014

(87) PCT Pub. No.: WO2012/147393
PCT Pub. Date: Nov. 1, 2012

(65) Prior Publication Data
US 2014/0265977 A1  Sep. 18, 2014

(30) Foreign Application Priority Data
Apr. 28, 2011 (JP) ................. 2011-102150

(51) Int. Cl.
| | |
|---|---|
| *H02H 7/085* | (2006.01) |
| *B60W 10/08* | (2006.01) |
| *B60W 10/30* | (2006.01) |
| *B60W 20/00* | (2006.01) |
| *B66F 9/075* | (2006.01) |
| *H02H 7/08* | (2006.01) |
| *B60W 10/06* | (2006.01) |
| *B60W 10/18* | (2012.01) |
| *B60W 30/184* | (2012.01) |
| *B60W 30/18* | (2012.01) |

(52) U.S. Cl.
CPC ............. *H02H 7/0852* (2013.01); *B60W 10/06* (2013.01); *B60W 10/08* (2013.01); *B60W 10/18* (2013.01); *B60W 10/30* (2013.01); *B60W 20/00* (2013.01); *B60W 20/108* (2013.01); *B60W 30/1843* (2013.01); *B66F 9/07572* (2013.01);
(Continued)

(58) Field of Classification Search
CPC .................................................... H02H 7/0852
USPC ......................................... 318/473, 471, 445
See application file for complete search history.

(56) References Cited

U.S. PATENT DOCUMENTS 7,615,951 B2 * 11/2009 Son et al. ....................... 318/432
7,702,432 B2 *  4/2010 Bandai et al. ................... 701/22
(Continued)

FOREIGN PATENT DOCUMENTS

| DE | 10 2004 040 315 A1 | 3/2006 |
| DE | 10 2005 003 881 A1 | 7/2006 |

(Continued)

OTHER PUBLICATIONS

Extended European Search Report issued Nov. 20, 2015 in corresponding European Patent Application No. 12777276.2.

*Primary Examiner* — David S Luo
(74) *Attorney, Agent, or Firm* — Birch, Stewart, Kolasch & Birch, LLP

(57) ABSTRACT

A hybrid industrial vehicle (1) has as a main configuration: an engine (2); a cargo handling generator motor (3) used for cargo handling; a cargo handling apparatus (4) that can be driven by power received from both the engine (2) and the cargo handling generator motor (3); and a hybrid control system (8). The hybrid control system (8) suppresses an output of the cargo handling generator motor (3) according to a temperature of the cargo handling generator motor (3) during powering of the cargo handling generator motor (3), and suppresses a regeneration amount of the cargo handling generator motor (3) according to the temperature of the cargo handling generator motor (3) during regeneration of the cargo handling generator motor (3).

10 Claims, 6 Drawing Sheets

(52) U.S. Cl.
CPC ....... *H02H7/0822* (2013.01); *B60W 30/18127* (2013.01); *B60W 2300/121* (2013.01); *B60W 2510/087* (2013.01)

(56) References Cited

U.S. PATENT DOCUMENTS

| | | | |
|---|---|---|---|
| 8,040,083 B2 * | 10/2011 | Okamura | B60K 6/445 180/65.1 |
| 2008/0041653 A1 | 2/2008 | Rogg | |
| 2010/0025167 A1 | 2/2010 | Staub et al. | |

FOREIGN PATENT DOCUMENTS

| | | |
|---|---|---|
| EP | 1 920 987 A2 | 5/2008 |
| JP | 2007-168502 A | 7/2007 |
| JP | 2008-260428 A | 10/2008 |
| JP | 3156582 U | 1/2010 |
| JP | 2010-213461 A | 9/2010 |
| JP | 2010-241322 A | 10/2010 |
| JP | 2010-260477 A | 11/2010 |
| JP | 2011-51661 A | 3/2011 |

* cited by examiner

HYBRID INDUSTRIAL VEHICLE

TECHNICAL FIELD

The present invention relates to hybrid industrial vehicles, such as a forklift.

BACKGROUND ART

In order to improve fuel consumption of industrial vehicles, there has been known a hybrid industrial vehicle whose power is supplied from a motor generator in addition to an engine. Generally, the hybrid industrial vehicle can store regeneration energy of a generator motor in a battery, and can reuse it at the time of powering.

In such hybrid industrial vehicle, extreme decrease and increase of a charging rate of a battery reduce a battery life, and thus it is known to appropriately manage the charging rate of the battery (for example, refer to PTL 1).

For example, in PTL 1, a technique has been disclosed that detects a charging rate and a battery temperature, and controls discharge allowable electric power in order to protect a battery in a hybrid industrial vehicle.

Specifically, PTL 1 discloses to use a smaller set value of the discharge allowable electric power from the battery when the battery temperature is low as well as when it is high, or the charging rate is small.

CITATION LIST

Patent Literature

{PTL 1}
the Publication of Japanese Examined Utility Model Registration No. 3156582

SUMMARY OF INVENTION

Technical Problem

Although a damage to the battery can be avoided by the technique disclosed in PTL 1, components other than a battery also need to be considered to operate an actual hybrid industrial vehicle.

For example, as for an industrial vehicle, there is a case where a comparatively inexpensive motor whose thermal efficiency is not high is mounted instead of an expensive motor, such as an IPM (Interior Permanent Magnet Motor) that is used for a hybrid ordinary vehicle, and the life may be significantly reduced by overuse due to regeneration of energy and supply of power.

An object of the present invention, which has been made in view of such circumstances, is to provide a hybrid industrial vehicle that can extend a life of a generator motor.

Solution to Problem

In order to solve the above-described problems, the present invention employs the following solutions.

The present invention provides a hybrid industrial vehicle having: an engine; a cargo handling generator motor used for cargo handling; a cargo handling unit that can be driven by power received from both the engine and the cargo handling generator motor; and a control unit, in which the control unit suppresses an output of the cargo handling generator motor according to a temperature of the cargo handling generator motor during powering of the cargo handling generator motor, and suppresses a regeneration amount by the cargo handling generator motor according to the temperature of the cargo handling generator motor during regeneration of the cargo handling generator motor.

As described above, since the output or the regeneration amount of the cargo handling generator motor is suppressed according to the temperature of the cargo handling generator motor, excessive rise in temperature of the cargo handling generator motor can be suppressed. As a result, even when a generator motor with a low thermal efficiency is used as the cargo handling generator motor, failure of the generator motor due to heat rise can be forestalled, and a life of the generator motor can be extended.

In a hybrid industrial vehicle of a first aspect of the present invention, the control unit changes a power distribution ratio of the engine and the cargo handling generator motor according to a temperature of the cargo handling generator motor during powering of the cargo handling generator motor, and changes a braking force distribution ratio by a braking unit and the cargo handling generator motor according to the temperature of the cargo handling generator motor during regeneration of the cargo handling generator motor.

According to the hybrid industrial vehicle of the first aspect of the present invention, when an output of the cargo handling generator motor is suppressed, deficient power due to the suppression is compensated from the engine, and when a regeneration amount of the cargo handling generator motor is suppressed, a deficient braking force due to the suppression is compensated by the braking unit. As a result, it becomes possible to continue operation without impairing maneuverability.

A hybrid industrial vehicle of a second aspect of the present invention is further provided with a traveling generator motor capable of supplying power to the cargo handling unit, and the control unit decreases power supply of the cargo handling generator motor according to the temperature of the cargo handling generator motor during powering of the cargo handling generator motor, compensates the decrement with power of the traveling generator motor, decreases the regeneration amount of the cargo handling generator motor according to the temperature of the cargo handling generator motor during regeneration of the cargo handling generator motor, and regenerates the decrement by the traveling generator motor.

According to the hybrid industrial vehicle of the second aspect of the present invention, when the output of the cargo handling generator motor is suppressed, deficient power due to the suppression is compensated from the traveling generator motor, and when the regeneration amount of the cargo handling generator motor is suppressed, the deficient braking force due to the suppression is compensated by the traveling generator motor. As a result, it becomes possible to continue operation without impairing maneuverability.

In a hybrid industrial vehicle of a third aspect of the present invention, the control unit calculates a parameter relating to the temperature of the cargo handling generator motor using at least any one of the temperature of the cargo handling generator motor, a temperature change rate of the cargo handling generator motor, a cargo load weight, and a cargo handling manipulation frequency, and suppresses the power and the braking force of the cargo handling generator motor according to the parameter.

According to the hybrid industrial vehicle of the third aspect of the present invention, not only the temperature of the cargo handling generator motor, but also information relating to the rise in temperature of the cargo handling generator motor are comprehensively used, and thereby it becomes possible to predict the rise in temperature of the cargo handling generator motor, and to control the cargo handling generator motor in advance.

The hybrid industrial vehicle of the third aspect of the present invention is further provided with a cooling unit that cools the generator motor, and when the temperature of the cargo handling generator motor exceeds a previously set predetermined threshold value, the hybrid industrial vehicle increases an output of the cooling unit.

According to the hybrid industrial vehicle of the third aspect of the present invention, excessive rise in temperature of the cargo handling generator motor can be more effectively suppressed.

Advantageous Effects of Invention

According to the present invention, an effect is exerted that the life of the generator motor can be extended.

DESCRIPTION OF EMBODIMENTS (First Embodiment)

Hereinafter, a first embodiment of a hybrid industrial vehicle pertaining to the present invention will be described with reference to drawings.

Figure 1:
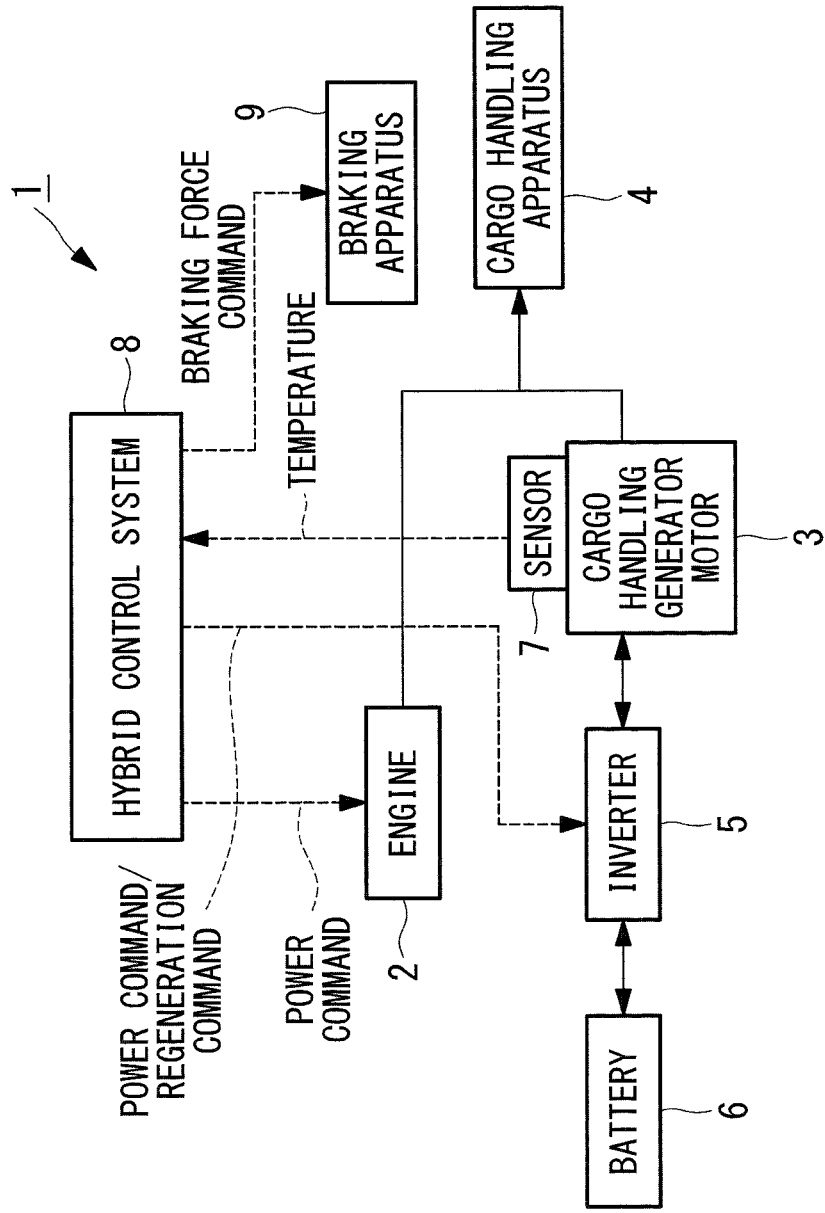
FIG. 1 is a block diagram showing a schematic configuration of a hybrid industrial vehicle pertaining to a first embodiment of the present invention.

FIG. 1 is a block diagram showing a schematic configuration of the hybrid industrial vehicle pertaining to the first embodiment of the present invention. As shown in FIG. 1, a hybrid industrial vehicle 1 is, for example, a forklift, and is provided with: an engine 2; a cargo handling generator motor 3; and a cargo handling apparatus (cargo handling unit) 4 that can be driven by power received from both the engine 2 and the cargo handling generator 3.

A battery 6 is electrically connected to the cargo handling generator motor 3 through an inverter 5. Powering of the cargo handling generator motor 3 is performed by electric power supply from the battery 6, and also regeneration energy generated by regeneration action of the cargo handling generator 3 is stored in the battery 6 as electricity. In the cargo handling generator motor 3, for example, when the cargo handling apparatus 4 lifts a cargo, powering is performed, and when the cargo handling apparatus 4 lowers the load, regeneration action is performed. In addition, in a case of regeneration action, a braking apparatus (braking unit) 9 is also used, and a regeneration amount of the cargo handling generator motor 3 can be adjusted by the braking apparatus 9.

The braking apparatus 9 is, for example, a mechanical brake provided at a shaft between a cargo handling pump (illustration is omitted) with which the cargo handling apparatus 4 is provided, and the cargo handling generator motor 3, and when the regeneration amount of the cargo handling generator motor 3 needs to be suppressed, the braking apparatus 9 increases a brake pressure, and generates thermal energy.

In addition, the braking apparatus 9 is, for example, the apparatus that controls an opening of a pressure control valve provided in a cargo handling hydraulic circuit, and when the regeneration amount of the cargo handling generator motor 3 needs to be suppressed, the braking apparatus 9 closes a valve opening of the pressure control valve, increases a pressure loss, and generates thermal energy.

At this time, the following relational expression is established in an ideal environment.

Potential energy of lifted cargo handling apparatus =
Kinetic energy according to cargo lowering
speed+Regeneration energy+Thermal energy The engine 2, the cargo handling generator motor 3, the inverter 5, and the braking apparatus 9 are controlled by a hybrid control system (control unit) 8.

A sensor 7 that detects a temperature is provided in the cargo handling generator motor 3. The sensor 7 can, for example, detect a temperature of a bearing or a coil portion. The temperature of the cargo handling generator motor 3 detected by the sensor 7 is input to the hybrid control system 8.

Description will be made to control of the cargo handling generator motor 3 in the hybrid industrial vehicle 1 with such a configuration with reference to FIGS. 2 and 3.

The following processing is performed in the hybrid control system 8 during powering of the cargo handling generator motor 3.

Figure 2:
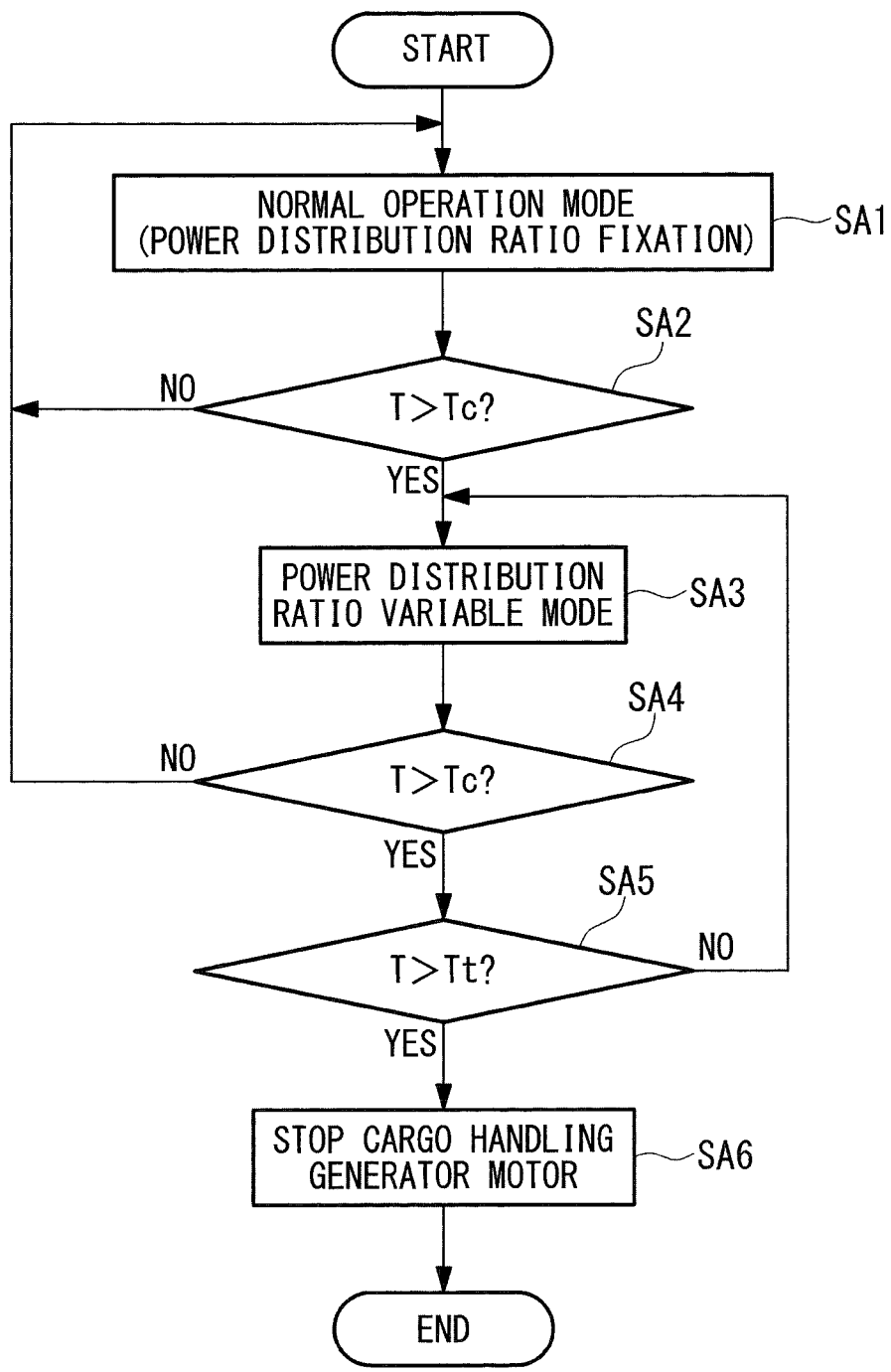
FIG. 2 is a flow chart showing processing executed by a hybrid control system during powering of a cargo handling generator motor.

First, a normal operation mode is executed in which a power distribution ratio of the engine 2 and the cargo handling generator motor 3 is fixed to a previously set ratio (step SA1 of FIG. 2).

Subsequently, it is determined whether or not a temperature T of the cargo handling generator motor 3 indicated by the sensor 7 exceeds a previously set threshold Tc (step SA2 of FIG. 2). The threshold Tc is set to be a value smaller than a stop threshold Tt at which the cargo handling generator motor 3 should be stopped.

In step SA2, if the temperature T does not exceed the threshold Tc, the program returns to step SA1, and maintains the normal operation mode, while if it exceeds the threshold, the program executes a power distribution ratio variable mode (step SA3 of FIG. 2).

Figure 4:
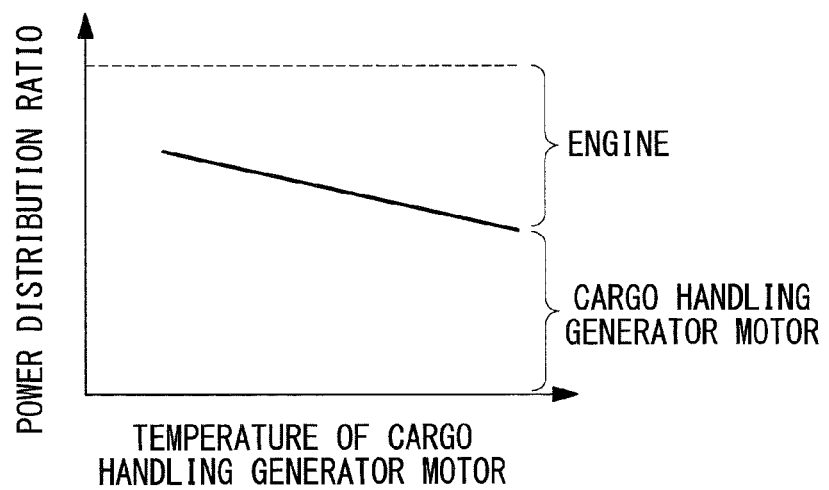
FIG. 4 is an illustration showing one example of a table referred to in a power distribution ratio variable mode.

The power distribution ratio variable mode is the mode in which an output of the cargo handling generator motor 3 is suppressed, and in which the power distribution ratio of the engine 2 and the cargo handling generator motor 3 is changed according to the temperature of the cargo handling generator motor 3. Specifically, the hybrid control system 8 has a table as shown in FIG. 4 in which the temperature of the cargo handling generator motor and the power distribution ratio are associated with each other, and acquires a power distribution ratio corresponding to a current temperature from the table. Here, the table is set so that distribution of the cargo handling generator motor decreases, and distribution of the engine 2 increases as the temperature becomes higher. The hybrid control system 8 then outputs to the engine 2 and the inverter 5 a power command according to the power distribution ratio acquired from such table.

Subsequently, it is determined again whether or not the temperature T of the cargo handling generator motor 3 indicated by the sensor 7 exceeds the threshold Tc (step SA4 of FIG. 2), and as a result, if the temperature T does not exceed the threshold Tc, the program returns to step SA1, and switches to the normal operation mode. Meanwhile, if the temperature T exceeds the threshold Tc, it is determined whether or not the temperature T exceeds the stop threshold Tt (step SA5 of FIG. 2), and if it does not exceed, the program returns to step SA3, and the power distribution ratio variable mode is maintained, while if it exceeds, the program stops the inverter 5 to stop power supply of the cargo handling generator motor 3 (step SA6 of FIG. 2).

Next, description will be made to processing by the hybrid control system 8 during regeneration of the cargo handling generator motor 3 with reference to FIG. 3.

Figure 3:
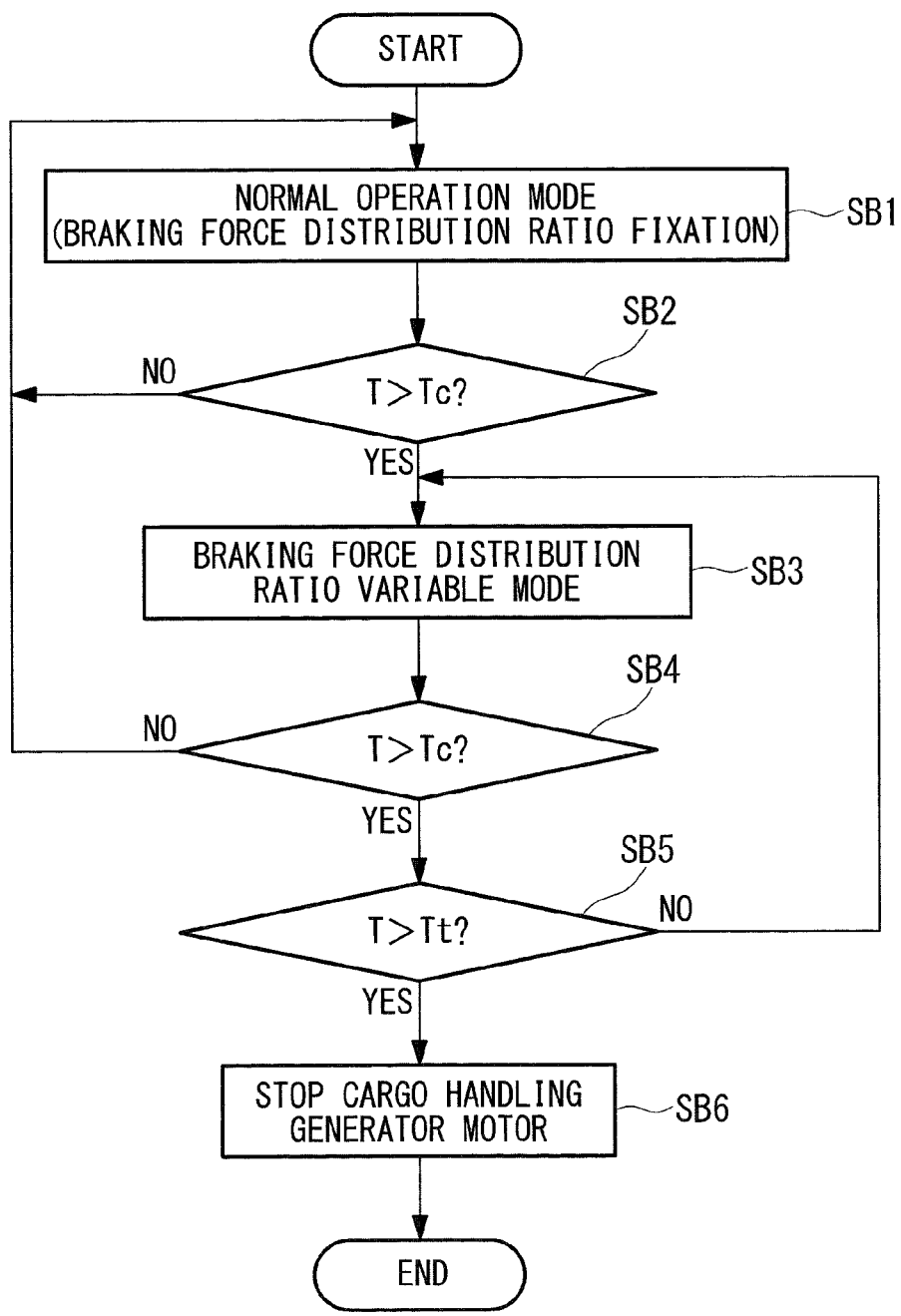
FIG. 3 is a flow chart showing processing executed by the hybrid control system during regeneration of the cargo handling generator motor.

First, a normal operation mode is executed in which a braking force distribution ratio of the braking apparatus 9 and the cargo handling generator motor 3 is fixed to a previously set ratio (step SB1 of FIG. 3).

Subsequently, it is determined whether or not the temperature T of the cargo handling generator motor 3 indicated by the sensor 7 exceeds the previously set threshold Tc (step SB2 of FIG. 3). The threshold is set to be a same value as in the above-described powering.

Figure 5:
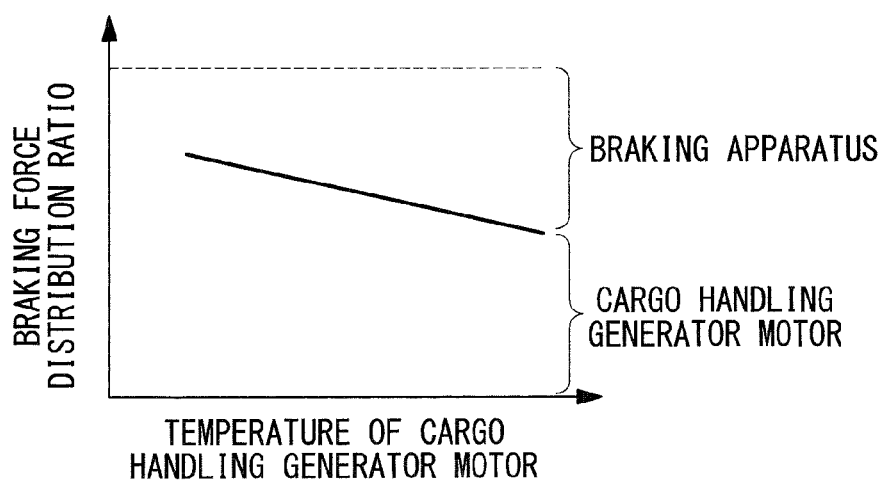
FIG. 5 is an illustration showing one example of a table referred to in a braking force distribution ratio variable mode.

In step SB2, if the temperature T does not exceed the threshold Tc, the program returns to step SB1, and maintains the normal operation mode, while if it exceeds the threshold Tc, the program executes a braking force distribution ratio variable mode (step SB3 of FIG. 3). The braking force distribution ratio variable mode is the mode in which a regeneration amount of the cargo handling generator motor 3 is suppressed, and the braking force distribution ratio of the braking apparatus 9 and the cargo handling generator motor 3 is changed according to the temperature of the cargo handling generator motor 3. Specifically, the hybrid control system 8 has a table as shown in FIG. 5 in which the temperature of the cargo handling generator motor 3 and the braking force distribution ratio are associated with each other, and acquires a braking force distribution ratio corresponding to a current temperature from the table. Here, the table is set so that distribution of the cargo handling generator motor 3 decreases, and distribution of the braking apparatus 9 increases as the temperature becomes higher.

The hybrid control system 8 then outputs to the braking apparatus 9 a braking force command according to the braking force distribution ratio, and also outputs a regeneration command to the inverter.

Subsequently, it is determined again whether or not the temperature of the cargo handling generator motor 3 indicated by the sensor 7 exceeds the threshold (step SB4 of FIG. 3), and as a result, if the temperature T does not exceed the threshold Tc, the program returns to step SB1, and switches to the normal operation mode. Meanwhile, if the temperature T exceeds the threshold Tc, the it is determined whether or not the temperature T exceeds the stop threshold Tt (step SB5 of FIG. 3), and if it does not exceeded, the program returns to step SB3, and the braking force distribution ratio variable mode is maintained, while if it exceeds, the program stops the inverter to stop regeneration action of the cargo handling generator motor 3 (step SB6 of FIG. 3).

As having described above, according to the hybrid industrial vehicle 1 pertaining to the embodiment, if the temperature T of the cargo handling generator motor 3 becomes higher than the predetermined threshold value Tc, a power supply amount or the regeneration amount of the cargo handling generator motor 3 is suppressed, and thus excessive rise in temperature of the cargo handling generator motor 3 can be suppressed. As a result, even when a generator motor with a low thermal efficiency (for example, a three-phase induction type generator motor) is used as the cargo handling generator motor 3, failure of the generator motor due to heat rise can be forestalled, and a life of the generator motor can be extended.

In addition, since deficient power due to suppressing the power supply amount of the cargo handling generator motor 3 is compensated by the engine 2, and a deficient braking force due to suppressing an energy regeneration amount of the cargo handling generator motor 3 is compensated by the braking apparatus 9, it becomes possible to continue operation without impairing maneuverability.

Note that although in the above-described embodiment, only information on the temperature of the cargo handling generator motor 3 is used to determine whether to make transition to the power distribution ratio variable mode or the braking force distribution ratio variable mode, information used for the determination is not limited to the temperature. For example, determination may be made using at least any one of the temperature of the cargo handling generator motor 3, a temperature change rate of the cargo handling generator motor 3, a cargo load weight, and a cargo handling manipulation frequency. In addition, the hybrid control system 8 holds an arithmetic expression in which at least one of the above is set as a variable, and with which a parameter relating to a temperature is calculated, and the above-described determination may be made based on the parameter calculated using the arithmetic expression. In addition, in this case, the above-described parameter may be used instead of the temperature also in the tables shown in FIGS. 4 and 5.

Here, the cargo handling manipulation frequency is the number of cargo handling manipulations for a predetermined time, and for example, it can be obtained by counting the number of manipulations of a cargo handling lever within the predetermined time.

As described above, not only the temperature of the cargo handling generator motor 3, but also information relating to the rise in temperature of the cargo handling generator motor 3 are comprehensively used to determine whether to make transition to the power distribution ratio variable mode or the braking force distribution ratio variable mode, whereby it becomes possible to predict the rise in temperature of the cargo handling generator motor 3 in the future, and to control the cargo handling generator motor 3 in advance.

(Second Embodiment)

Next, description will be made to a hybrid industrial vehicle pertaining to a second embodiment of the present invention with reference to FIG. 6. Hereinafter, explanation of points in common with the above-mentioned first embodiment will be omitted, and different points will be mainly described.

Figure 6:
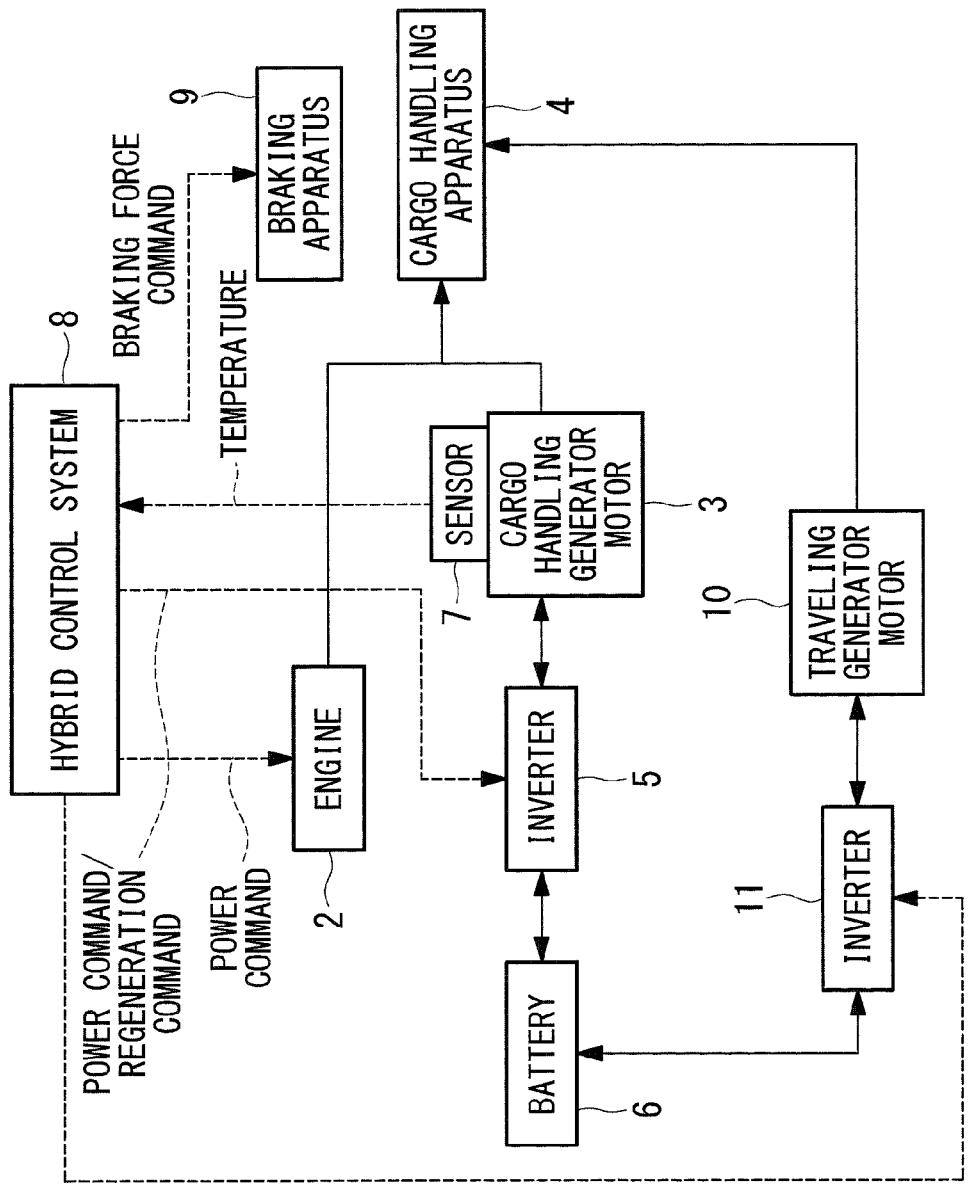
FIG. 6 is a block diagram showing a schematic configuration of a hybrid industrial vehicle pertaining to a second embodiment of the present invention.

The hybrid industrial vehicle pertaining to the embodiment, as shown in FIG. 6, has a traveling generator motor 10 that supplies power to traveling apparatuses, such as a wheel, and it is configured such that power supply from the traveling generator motor 10 to the cargo handling apparatus 4 and regeneration action of the traveling generator motor 10 can be performed. The traveling generator motor 10 is, for example, connected to the battery 6 through an inverter 11.

Additionally, if the program transitions to the power distribution ratio variable mode at the time of powering of the cargo handling generator motor 3, a decrement of distribution of the cargo handling generator motor 3 is not compensated by the engine 2, but is compensated by power supply from the traveling generator motor 10, and also if the program transitions to the braking force distribution ratio variable mode at the time of regeneration of the cargo handling generator motor 3, the decrement of distribution of the cargo handling generator motor 3 is not compensated by the braking apparatus 9, but is compensated by a regeneration amount by the traveling generator motor 10.

As having described above, according to the hybrid industrial vehicle pertaining to the embodiment, deficiencies of the power supply amount and the energy regeneration amount of the cargo handling generator motor 3 are compensated by the traveling generator motor 10, and thereby excessive rise in temperature of the cargo handling generator motor 3 can be suppressed. As a result, even when a generator motor with a low thermal efficiency is used as the cargo handling generator motor 3, failure of the generator motor due to heat rise can be forestalled, and a life of the cargo handling generator motor 3 can be extended. In addition, since deficiencies of the power supply amount and the energy regeneration amount of the cargo handling generator motor 3 are compensated by the traveling generator motor 10, it becomes possible to continue operation without impairing maneuverability.

Figure 7:
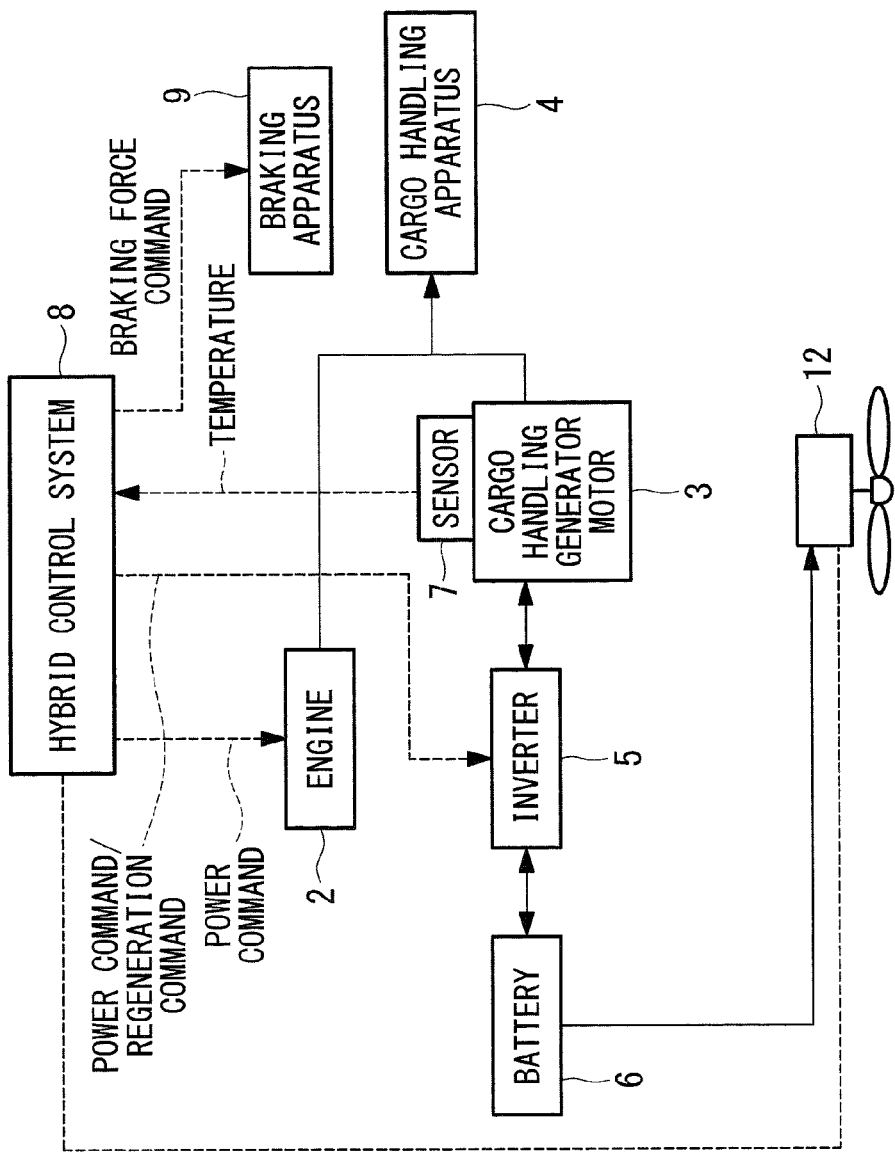
FIG. 7 is a block diagram showing a schematic configuration of a hybrid industrial vehicle pertaining to an other embodiment of the present invention.

In addition, in the above-mentioned each embodiment, for example, as shown in FIG. 7, a cooling fan (cooling unit) 12 that cools the cargo handling generator motor 3 is provided near the cargo handling generator motor 3, and if the temperature of the cargo handling generator motor 3 exceeds a predetermined value, an output of the cooling fan 12 may be increased. As a result, excessive rise in temperature of the cargo handling generator motor 3 can be more effectively suppressed. In this case, for example, control of the cooling fan 12 is performed by the hybrid control system 8, and electric power supply to the cooling fan 12 is performed from the battery 6.

REFERENCE SIGNS LIST

1 Hybrid industrial vehicle
2 Engine
3 Cargo handling generator motor
4 Cargo handling apparatus
5 Inverter
6 Battery
7 Sensor
8 Hybrid control system
9 Braking apparatus
10 Traveling generator motor
11 Inverter
12 Cooling fan

The invention claimed is:

1. A hybrid industrial vehicle comprising:
an engine;
a cargo handling generator motor used for cargo handling;
a cargo handling unit that can be driven by power received from both the engine and the cargo handling generator motor;
a battery; and
a control unit,
wherein the control unit reduces an output of the cargo handling generator motor according to a temperature of the cargo handling generator motor during powering of the cargo handling generator motor where electric power is supplied from the battery to the cargo handling generator motor, and reduces a regeneration amount by the cargo handling generator motor according to the temperature of the cargo handling generator motor during regeneration of the cargo handling generator motor.

2. The hybrid industrial vehicle according to claim 1, wherein the control unit changes a power distribution ratio of the engine and the cargo handling generator motor according to the temperature of the cargo handling generator motor during powering of the cargo handling generator motor, and changes a braking force distribution ratio by a braking unit and the cargo handling generator motor according to the temperature of the cargo handling generator motor during regeneration of the cargo handling generator motor.

3. The hybrid industrial vehicle according to claim 2, wherein the control unit calculates a parameter relating to the temperature of the cargo handling generator motor using at least any one of the temperature of the cargo handling generator motor, a temperature change rate of the cargo handling generator motor, a cargo load weight, and a cargo handling manipulation frequency, and suppresses power and a braking force of the cargo handling generator motor according to the parameter.

4. The hybrid industrial vehicle according to claim 2, comprising
a cooling unit that cools the generator motor,
wherein if the temperature of the cargo handling generator motor exceeds a previously set predetermined threshold value, an output of the cooling unit is increased.

5. The hybrid industrial vehicle according to claim 1, comprising
a traveling generator motor capable of supplying power to the cargo handling unit,
wherein the control unit decreases power supply of the cargo handling generator motor according to the temperature of the cargo handling generator motor during powering of the cargo handling generator motor, compensates the decrement with power of the traveling generator motor, decreases the regeneration amount of the cargo handling generator motor according to the temperature of the cargo handling generator motor during regeneration of the cargo handling generator motor, and regenerates the decrement by the traveling generator motor.

6. The hybrid industrial vehicle according to claim 5, wherein the control unit calculates a parameter relating to the temperature of the cargo handling generator motor using at least any one of the temperature of the cargo handling generator motor, a temperature change rate of the cargo handling generator motor, a cargo load weight, and a cargo handling manipulation frequency, and suppresses power and a braking force of the cargo handling generator motor according to the parameter.

7. The hybrid industrial vehicle according to claim 5, comprising
a cooling unit that cools the generator motor,
wherein if the temperature of the cargo handling generator motor exceeds a previously set predetermined threshold value, an output of the cooling unit is increased.

8. The hybrid industrial vehicle according to claim 1, wherein the control unit calculates a parameter relating to the temperature of the cargo handling generator motor using at least any one of the temperature of the cargo handling generator motor, a temperature change rate of the cargo handling generator motor, a cargo load weight, and a cargo handling manipulation frequency, and suppresses power and a braking force of the cargo handling generator motor according to the parameter.

9. The hybrid industrial vehicle according to claim 8, comprising
a cooling unit that cools the generator motor,
wherein if the temperature of the cargo handling generator motor exceeds a previously set predetermined threshold value, an output of the cooling unit is increased.

10. The hybrid industrial vehicle according to claim 1, comprising
a cooling unit that cools the generator motor,
wherein if the temperature of the cargo handling generator motor exceeds a previously set predetermined threshold value, an output of the cooling unit is increased.

* * * * *